(12) United States Patent
Krajnc et al.

(10) Patent No.: US 11,310,896 B2
(45) Date of Patent: Apr. 19, 2022

(54) CONTROLLER FOR CONFIGURING A LIGHTING SYSTEM

(71) Applicant: SIGNIFY HOLDING B.V., Eindhoven (NL)

(72) Inventors: Hugo Jose Krajnc, Eindhoven (NL); Gerardus Wilhelmus Theodorus Van Der Heijden, Haaren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/258,264

(22) PCT Filed: Jul. 1, 2019

(86) PCT No.: PCT/EP2019/067525
§ 371 (c)(1),
(2) Date: Jan. 6, 2021

(87) PCT Pub. No.: WO2020/007762
PCT Pub. Date: Jan. 9, 2020

(65) Prior Publication Data
US 2021/0274621 A1    Sep. 2, 2021

(30) Foreign Application Priority Data
Jul. 6, 2018  (EP) .................................... 18182185

(51) Int. Cl.
*H05B 47/19* (2020.01)
*H05B 47/165* (2020.01)

(52) U.S. Cl.
CPC ........... *H05B 47/19* (2020.01); *H05B 47/165* (2020.01)

(58) Field of Classification Search
CPC ............................. H05B 47/19; H05B 47/165
See application file for complete search history.

(56) References Cited

U.S. PATENT DOCUMENTS

2012/0081030 A1    4/2012   Berkvens et al.
2015/0161137 A1    6/2015   Lashina et al.
(Continued)

FOREIGN PATENT DOCUMENTS

EP        2890223 B1     5/2020
WO    2009060369 A2     5/2009
(Continued)

*Primary Examiner* — Daniel D Chang (57) ABSTRACT

A controller (102) for configuring a lighting system (100, 200, 300) is disclosed. The controller (102) comprises a receiver (106) configured to receive a signal indicative of an addition of a new lighting device (110) to the lighting system (100, 200, 300), and to receive data indicative of light rendering capabilities of the new lighting device (110), and a processor (104) configured to: a obtain lighting control settings of a lighting control device (120), wherein the lighting control settings are representative of a plurality of user inputs associated with predefined light scenes, wherein each predefined light scene is representative of lighting control instructions for one or more target lighting devices (112), (114), b generate a new light scene based on the light rendering capabilities of the new lighting device (110), the new light scene comprising lighting control instructions for at least the new lighting device (110), and c store an association between the new light scene and a new user input in a memory (108), or replace the new light scene with one of the plurality of predefined light scenes in the memory (108).

15 Claims, 4 Drawing Sheets

(56) References Cited

U.S. PATENT DOCUMENTS

| | | | |
|---|---|---|---|
| 2015/0189723 A1* | 7/2015 | Ogawa | H05B 47/195 |
| | | | 315/294 |
| 2016/0091217 A1 | 3/2016 | Verberkt et al. | |
| 2018/0278327 A1* | 9/2018 | Krajnc | H04W 76/10 |

FOREIGN PATENT DOCUMENTS

| | | |
|---|---|---|
| WO | 2016019005 A1 | 2/2016 |
| WO | 2017025324 A1 | 2/2017 |
| WO | 2018046710 A1 | 3/2018 |

* cited by examiner

CONTROLLER FOR CONFIGURING A LIGHTING SYSTEM

CROSS-REFERENCE TO PRIOR APPLICATIONS

This application is the U.S. National Phase application under 35 U.S.C. § 371 of International Application No. PCT/EP2019/067525, filed on Jul. 1, 2019, which claims the benefit of European Patent Application No. 18182185.1, filed on Jul. 6, 2018. These applications are hereby incorporated by reference herein.

FIELD OF THE INVENTION

The invention relates to a controller for configuring a lighting system, and to a lighting control device comprising the controller. The invention further relates to a method of configuring a lighting system, and to a computer program product for executing the method.

BACKGROUND

Current smart lighting systems allow a user to control lighting devices via different types of control interfaces. One of these control interfaces is an application running on a smartphone, pc, tablet, etc. This provides a user a rich user interface with multiple options for lighting control. Another type of control interface uses an accessory device, such as a light switch or a remote control device. Such lighting control devices provide more limited lighting control options. For example, a light switch may comprise two buttons: an off-button that enables a user to switch one or more lighting devices off, and an on-button that enables the user to switch the one or more lighting devices on. Many of these switches further enable a user to touch/press the on-button multiple times to cycle through a plurality of predefined light scenes to control the one or more lighting devices according to these light scenes. If a user would add a new lighting device to the lighting system, the user would have to assign the new lighting device to a predefined light scene.

U.S. patent application 2016/0091217 A1 discloses a system for adjusting environmental conditions based on automatically and manually generated requests. Devices may be commissioned in the system, and devices may report their properties to a commissioning tool. A luminaire may re-port, for example, information indicative of its CCT or max output. A commissioned unit may affect the behavior of the other commissioned units with which it is linked. A user may use the commissioning tool to create a template of a particular lighting scene for a commissioned unit by specifying lighting parameters for various luminaires included within the commissioned unit. Such a lighting scene may thereafter be used as a default scene in a meeting zone associated with the commissioned unit, when the meeting zone transitions from an unoccupied to an occupied state. The commissioning tool may allow the user to save current light settings of a commissioned unit as a new scene. A user may select light scenes via a graphical user interface, which scenes may be retrieved from a memory.

SUMMARY OF THE INVENTION

It is an object of the present invention to simplify the process of adding a lighting device to a lighting system that has predefined light scenes.

According to a first aspect of the present invention, the object is achieved by a controller for configuring a lighting system, the controller comprising:

a receiver configured to receive a signal indicative of an addition of a new lighting device to the lighting system, and to receive data indicative of light rendering capabilities of the new lighting device, and a processor configured to:

a) obtain lighting control settings of a lighting control device, wherein the lighting control settings are representative of a plurality of user inputs associated with predefined light scenes, wherein each predefined light scene is representative of lighting control instructions for one or more target lighting devices, b) generate a new light scene based on the light rendering capabilities of the new lighting device, the new light scene comprising lighting control instructions for at least the new lighting device, and c) store an association between the new light scene and a new user input in a memory, or replace the new light scene with one of the plurality of predefined light scenes in the memory.

The controller is configured to obtain lighting control settings of a lighting control device (such as a light switch). The lighting control settings relate to user inputs that can be received via a physical user input element (e.g. a button or a touch surface) of the lighting control device. Each of these user inputs may be associated with a predefined light scene. Thus, when a user provides a user input via the user input element, for instance by pressing a certain button (or a sequence of button pressings) of a light switch, one or more lighting devices of the lighting system may be controlled according to the light scene associated with that user input.

The controller is further configured to receive an indication that a new lighting device has been added to the lighting system, and to receive light rendering capabilities of the new lighting device. The light rendering capabilities may, for instance, relate to the color (temperature) of the light that can be produced by the new lighting device, the beam width of the lighting device, the dimming range/brightness range of the new lighting device, etc. Based on the light rendering capabilities, the processor generates a new light scene for the lighting system. The processor may be configured to generate the new light scene when the new lighting device is not able to render light settings of the predefined light scenes. The predefined light scenes may for example be color light scenes, and the new lighting device may be configured to provide white light (only). Based thereon, the processor may generate a (new) white light scene and store the light scene in a memory comprising the predefined light scenes. The processor may store the new light scene as an additional light scene, or the processor may replace the new light scene with one of the already stored predefined light scenes. The processor may associate the new light scene with a new user input (e.g. to a specific button or to a specific sequence of button pressings), or associate the new light setting with a new user input similar to the one that was already associated with the replaced predefined light scene (e.g. the same button or the same sequence of button pressings). Thus, when a user would provide the new user input via the physical user input element of the lighting control device, the new lighting device (and, optionally, one or more other lighting devices of the lighting system) would be controlled according to the new light scene. This results in automatic addition of the new lighting device to the lighting system.

This is beneficial, because it simplifies the process of adding a new lighting device to a lighting system that has predefined light scenes.

The processor may be further configured to assign the new lighting device to at least one of the predefined light scenes based on the light rendering capabilities of the new lighting device. If the new lighting device is configured to provide a light setting that corresponds to a light setting of one of the predefined light scenes, the processor may assign/associate the new lighting device to that light scene. Thus, when a user would provide a user input associated with that light scene, both an already associated lighting device and the new lighting device would be controlled based on the light scene.

The predefined light scenes may be stored as a sequence of light scenes, and the processor may be configured to add the new light scene to the sequence or to replace the new light scene with one of the light scenes of the sequence. Some lighting control devices only have a limited number of user input elements, but by providing multiple (sequential) user inputs, a user may cycle through different scenes. For instance, a user may provide a first user input via a user input element, which first user input may be associated with a first light scene, resulting in that the one or more lighting devices of the lighting system are controlled according to the first light scene. A user may then provide a second user input via the same user input element (for example within a predefined time period), which second user input may be associated with a second light scene, resulting in that the one or more lighting devices of the lighting system are (subsequently) controlled according to second light scene. If a user would add a new lighting device to this system, the processor may add the generated new light scene to the sequence or replace the new light scene with one of the light scenes of the sequence. This is beneficial, because after the addition/replacement, a user can cycle through the light scenes to also control the new lighting device according to the new light scene.

The processor may be further configured to collect or obtain historical data indicative of historical user selections of light scenes of the sequence, and determine the order of the sequence based on the historical user selection. This is beneficial, as the order of the sequence may be based on a user's favorite light scenes.

The processor may be further configured to determine the order of the sequence based on the light settings of the predefined light scenes. The processor may, for instance, arrange the light scenes based on their hue, saturation and/or brightness. This is beneficial, as the order of the sequence may be intuitive for the user and because ensures that the transition between the different subsequent scenes is smooth/gradual and does not disturb the user.

The receiver may be configured to receive light rendering capabilities of the one or more lighting devices, and the processor may be configured to generate the new light scene further based on the light rendering capabilities of the one or more lighting devices, such that the new light scene further comprises lighting control instructions for at least one of the one or more lighting devices. In other words, the processor may generate the new light scene for the newly installed lighting device and one or more of the already installed lighting devices. If one or more of the already installed lighting devices have light rendering capabilities similar to those of the new lighting device, the one or more of the already installed lighting devices may be assigned/associated with the new light scene as well. This is beneficial, because a user selectable light scene for both the one or more of the already installed lighting devices and the new light device is automatically generated.

The receiver may be further configured to receive data indicative of a distribution of one or more light sources in the new lighting device, and the generation of the new light scene may be further based on the distribution of the one or more light sources. The distribution of the light sources, and the light sources' control options, may be relevant in determining whether the new lighting device can render certain light effects. For instance, an LED strip comprising a plurality of individually controllable color light sources can render completely different light effects compared to an LED bulb with a single colored light source. Therefore, it is beneficial to take the distribution, and the light sources' control options, into account when generating the new light scene.

The predefined light scenes may be color light scenes, and the light rendering capabilities of the new lighting device may be indicative of that the new lighting device is configured to provide white light, and the processor may be configured to generate a white light scene as the new light scene. Alternatively, the predefined light scenes may be white light scenes, and the light rendering capabilities of the new lighting device may be indicative of that the new lighting device is configured to provide colored light, and the processor may be configured to generate a color light scene as the new light scene.

The processor may be configured to (temporarily) change the light output of at least the new lighting device after the new light scene has been stored or replaced to indicate to a user that the new light scene has been stored or replaced. This is beneficial because it shows a user that the new light scene has been stored or replaced.

The controller may be comprised in a bridge device, and the memory may be comprised in the lighting control device, and the processor may be configured to communicate the new light scene to the lighting control device. The bridge device, comprising the controller, may be configured to communicate with and configure lighting control devices and lighting devices. Thus, when a new lighting device is added to the lighting system, the bridge device may identify the new lighting device, and the controller (comprised in the bridge device) may subsequently configure the lighting control device (e.g. a light switch). According to a second aspect of the present invention, the object is achieved by a bridge device comprising the controller.

According to a third aspect of the present invention, the object is achieved by a lighting control device for configuring a lighting system, comprising:

the controller, a user input element configured to receive the plurality of user inputs, the memory configured to store associations between the plurality of user inputs and the predefined light scenes, a control module configured to control the one or more lighting devices according to a light scene associated with a respective user input upon receiving the respective user input.

The lighting control device may be configured to receive a configuration user input, and the processor may be configured to set the lighting control device in a configuration mode based on the configuration user input, wherein, in the configuration mode, the receiver may be configured to receive the signal from the new lighting device. This is beneficial, because it enables a user to start a configuration mode wherein the user can add the new lighting device to the lighting system.

The predefined light scenes may be stored as a sequence of light scenes in the memory, and the control module may be configured to control the one or more target lighting devices according to a subsequent light scene of the sequence each time a user provides a user input via the user input element.

According to a fourth aspect of the present invention, the object is achieved by a method of configuring a lighting system, the method comprising:

receiving a signal indicative of an addition of a new lighting device to the lighting system, receiving data indicative of light rendering capabilities of the new lighting device, obtaining lighting control settings of a lighting control device, wherein the lighting control settings are representative of a plurality of user inputs associated with predefined light scenes, wherein each predefined light scene is representative of lighting control instructions for one or more target lighting devices, generating a new light scene based on the light rendering capabilities of the new lighting device, the new light scene comprising lighting control instructions for at least the new lighting device, and storing an association between the new light scene and a new user input in a memory, or replacing the new light scene with one of the plurality of predefined light scenes in the memory.

According to a fifth aspect of the present invention, the object is achieved by a computer program product for a computing device, the computer program product comprising computer program code to perform the method when the computer program product is run on a processing unit of the computing device.

It should be understood that the bridge device, the lighting control device, the method and the computer program product may have similar and/or identical embodiments and advantages as the above-mentioned controller.

In the context of the present invention, the term "light scene" relates to lighting control instructions/light settings for one or more lighting devices. The lighting control instructions may be the same for each lighting device, or be different for different lighting devices. The lighting control instructions may relate to one or more light settings, which may for instance be defined as RGB/HSL/HSB color values, CIE color values, brightness values, etc.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
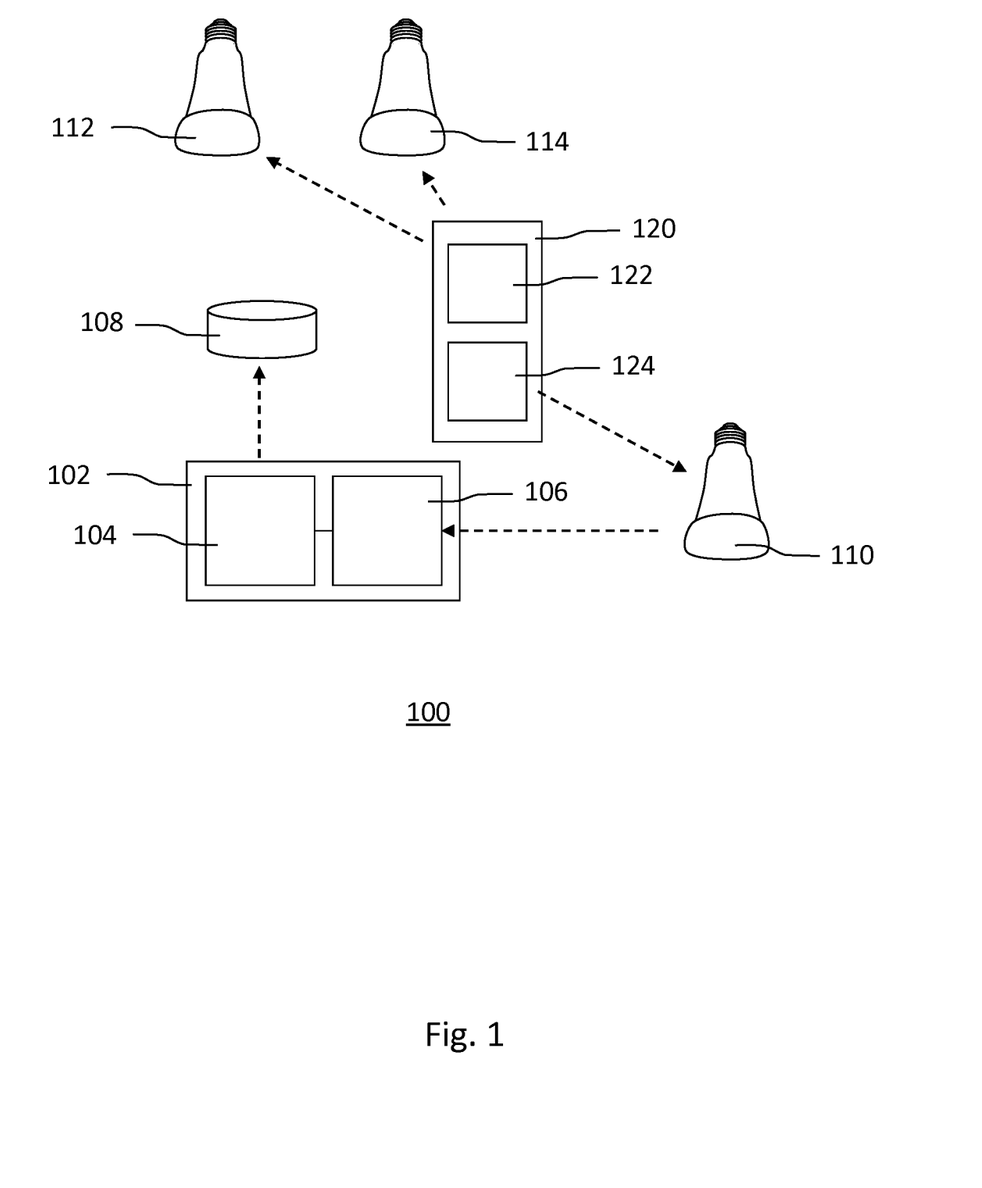
FIG. 1 shows schematically an embodiment of a lighting system comprising a lighting control device, a memory, lighting devices and a controller for configuring the lighting system.

FIG. 1 shows schematically an embodiment of a lighting system 100 comprising a lighting control device 120, a memory 108, lighting devices 110, 112, 114 and a controller 102 for configuring the lighting system 100.

The controller 102 comprises a receiver 106 configured to receive a signal indicative of an addition of a new lighting device 110 to the lighting system 100, and to receive data indicative of light rendering capabilities of the new lighting device 110. The receiver 106 may receive the signal and the data directly from the new lighting device 110, or via an intermediate device such as a bridge, a router or a hub. Various wired and wireless communication protocols may be used for communicating the signal and the data from the new lighting device 110 to the controller 102, for example Ethernet, DMX, DALI, USB, Bluetooth, Wi-Fi, Li-Fi, 3G, 4G or ZigBee. In embodiments, the signal may comprise the data indicative of the light rendering capabilities of the new lighting device 110. The receiver 106 may comprise an NFC (near field communication) module configured to communicate with lighting device 110 when the new lighting device has been brought into communication distance of with the NFC module.

The controller 102 may be configured to receive a configuration user input, for instance based on a user input provided via a user interface of the controller or via a user interface of the lighting control device. The processor 104 may be further configured to set the lighting control device 120 in a configuration mode, wherein, in the configuration mode, the receiver 106 is configured to receive the signal from the new lighting device 110. A user may, for instance, hold a certain button or press a specific (configuration) button for a predefined time to activate the configuration mode. The user may provide a subsequent user input to deactivate the configuration mode.

Figure 3:
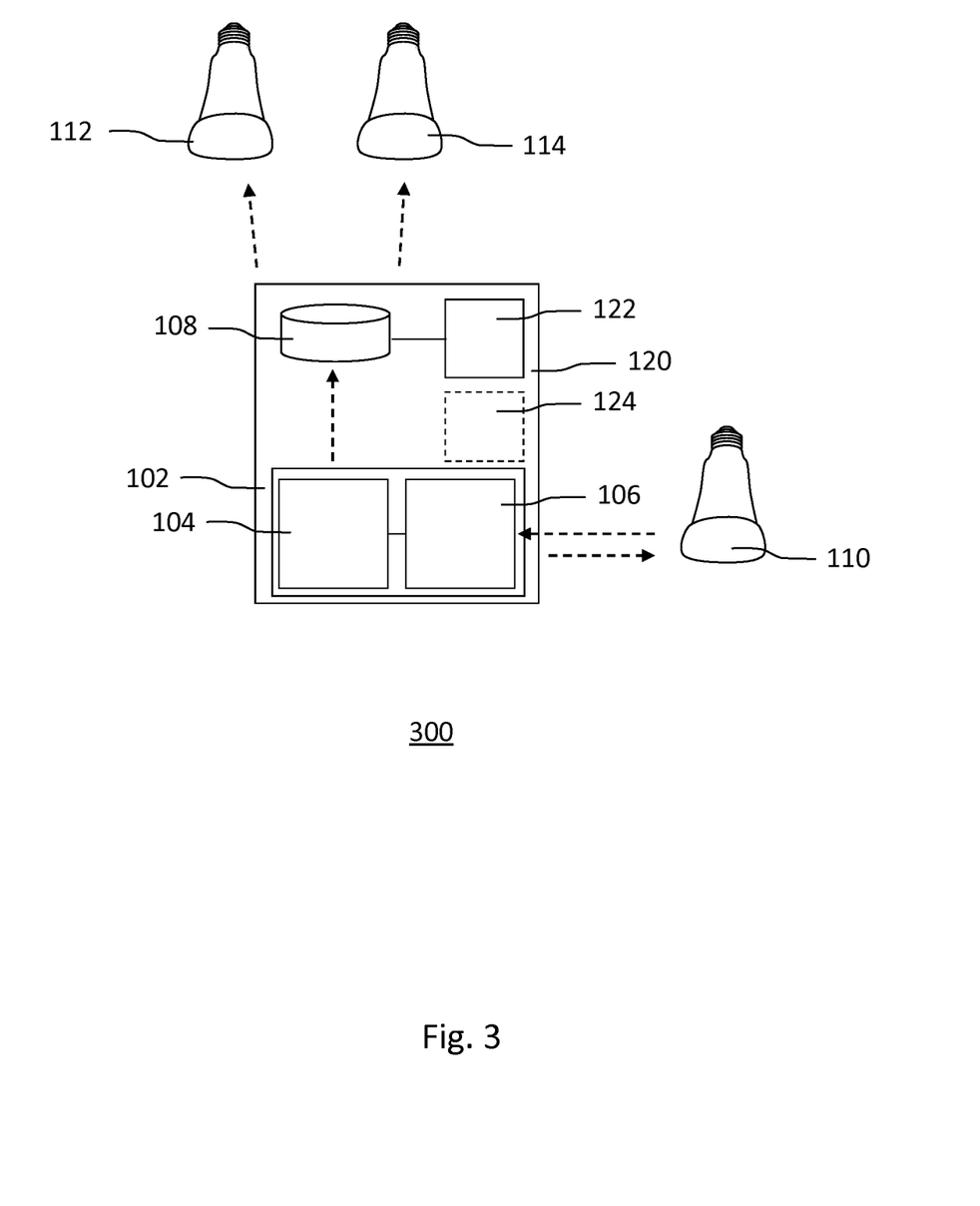
FIG. 3 shows schematically an embodiment of a lighting system comprising lighting devices and a lighting control device for controlling and configuring the lighting system.

The controller 102 further comprises a processor 104 (e.g. circuitry, a microcontroller, a microchip, etc.) configured to obtain lighting control settings of the lighting control device 120. The processor 104 may be configured to receive the lighting control settings from the lighting control device 120 and/or by accessing a (remote) memory 108 storing the lighting control settings. The memory 108, which may be located in a device such as a bridge, or which may be located remotely, may be accessed via a (wireless) network, for instance via a WiFi, Bluetooth or ZigBee network, or via the internet. In embodiments wherein the controller 102 is comprised in the lighting control device 120 (as illustrated in FIG. 3), the controller 102 may be coupled to a memory 108 comprised in the lighting control device 120 and the processor 104 may obtain the lighting control settings directly from the memory 108.

The lighting control settings are representative of a plurality of user inputs associated with predefined light scenes, wherein each predefined light scene is representative of lighting control instructions for one or more target lighting devices. The lighting control settings may be defined as a table storing associations between light scenes and target lighting devices. Table 1 illustrates an example of such a table, referring to lighting devices 112 and 114. In the examples of Tables 1-4 lighting devices 112 and 114 are lighting devices comprising red, green and blue (RGB) light sources for color mixing.

TABLE 1

| Light scene | User input | Lighting device 112 | Lighting device 114 |
|---|---|---|---|
| 1 | First press | RGB value [255, 0, 0] | RGB value [255, 100, 100] |
| 2 | Second press | RGB value [0, 250, 0] | RGB value [100, 255, 100] |

Light scene 1 may, for example, be a red light scene (e.g. a sunset light scene) comprising a first light setting (RGB value [255,0,0]) for first target lighting device 112 and a second light setting (RGB value [255,100,100]) for second target lighting device 114. Light scene 2 may, for example, be a green light scene (e.g. a forest light scene) comprising a first light setting (RGB value [0,250,0]) for first target lighting device 112 and a second light setting (RGB value [100,255,100]) for second target lighting device 114. Light scene 1 may be associated with a first user input, e.g. a first pressing of a user input element 122, and light scene 2 may be associated with a second user input, e.g. a second pressing of the user input element 122. Thus, when a user would press the user input element 122 of the lighting control device 120, lighting devices 112 and 114 would be controlled according to light scene 1. If the user would press the user input element 122 of the lighting control device 120 a second time, lighting devices 112 and 114 would be controlled according to light scene 2.

The processor 104 is further configured to generate a new light scene based on the light rendering capabilities of the new lighting device 110. The processor 104 is further configured to store an association between the new light scene and a new user input in the memory 10. Alternatively, the processor 104 may be configured to replace the new light scene with one of the plurality of predefined light scenes in the memory 108. In the examples of Tables 2-4, the light rendering capabilities of lighting device 110 may, for example, be indicative of that the new lighting device is capable of rendering white light with a color temperature of 4000K. The processor 104 may generate a new light scene comprising lighting control instructions for the new lighting device 110 based on this information. Table 2 illustrates an example of a new light setting comprising control instructions for the new lighting device 110, associated with a new user input.

TABLE 2

| Scene | User input | Lighting device 112 | Lighting device 114 | Lighting device 110 |
|---|---|---|---|---|
| 1 | 1$^{st}$ press | RGB [255, 0, 0] | RGB [255, 100, 100] | Off |
| 2 | 2$^{nd}$ press | RGB [0, 250, 0] | RGB [100, 255, 100] | Off |
| 3 | 3$^{rd}$ press | Off | Off | On |

New light scene 3 may, for instance, be a simple 'On' value that will be sent to lighting device 110 when a user presses the user input element 122 for a third time. In this example, lighting devices 112 and 114 are not part of the third light scene. In this example, a third light scene has been added. Alternatively, the processor 104 may replace a predefined light scene (e.g. light scene 2) with the new light scene.

The processor 104 may be further configured to generate the new light scene further based on the light rendering capabilities of the one or more lighting devices 112, 114. These light rendering capabilities may be received by the receiver 106. The processor 104 may generate the new light scene such that it further comprises lighting control instructions for lighting devices 112, 114. This has been illustrated in Table 3.

TABLE 3

| Scene | User input | Lighting device 112 | Lighting device 114 | Lighting device 110 |
|---|---|---|---|---|
| 1 | 1$^{st}$ press | RGB [255, 0, 0] | RGB [255, 100, 100] | Off |
| 2 | 2$^{nd}$ press | RGB [0, 250, 0] | RGB [100, 255, 100] | Off |
| 3 | 3$^{rd}$ press | RGB [255, 209, 163] | RGB [255, 209, 163] | On |

In this example, new scene 3 may comprise control instructions for lighting devices 112 and 114. When a user presses the user input element 122 for a third time, lighting device 110 is turned on such that it emits white light of 4000K, and lighting devices 112 and 114 are controlled according to RGB values [255,209,163], which values approximate white light of 4000K. The lighting control values for the one or more lighting devices 112, 114 need not necessarily need to approximate the light setting of the new lighting device. The lighting control values may be color values within a predefined range from the light setting of the new lighting device.

The processor 104 may be further configured to assign the new lighting device 110 to at least one of the predefined light scenes based on the light rendering capabilities of the new lighting device 110. The processor 104 may be further configured to obtain a rule associated with a light scene, which rule may be indicative of a light setting according to which a new lighting device 110 is to be controlled when it is added to that light scene. The processor 104 may assign the new lighting device 110 to at least one of the predefined light scenes if the differences between the light settings (e.g. light color values) of the at least one predefined light scenes and the light rendering capabilities (e.g. color rendering range) are within a threshold range. A predefined light scene may, for instance, comprise information about possible light colors/intensities that may be associated with that predefined light scene. In embodiments, a predefined light scene may be based on the color values of an image, and the possible light colors/intensities may be based on the color values of the image. The processor 104 may compare the possible light colors/intensities of a/each predefined light scene with the light rendering capabilities of the lighting device 110 to determine if the new lighting device 110 is able to render a possible light color/intensity. If so, the processor 104 may assign the lighting device 110 to that predefined light scene. An example is further illustrated in Table 4.

TABLE 4

| User Scene input | | Lighting device 112 | Lighting device 114 | Lighting device 110 |
|---|---|---|---|---|
| 1 | 1st press | RGB [255, 0, 0] | RGB [255, 100, 100] | On |
| 2 | 2nd press | RGB [0, 250, 0] | RGB [100, 255, 100] | Off |
| 3 | 3rd press | RGB [255, 209, 163] | RGB [255, 209, 163] | On |

In the example of Table 4, new lighting device 110 has been assigned to/associated with light scene 1. 4000K white light may fall within the range of possible light colors of light scene 1 (a red light scene, for instance a representative of a setting sun). The processor 104 may therefore associate lighting device 110 with light scene 1, such that when a user provides the first user input, lighting devices 110, 112, 114 will be controlled according to the values in Table 4.

In the above-mentioned examples the lighting devices 112 and 114 are lighting devices configured to emit colored light, and new lighting device 110 is a lighting device configured to emit white light only. It should be understood that this is merely an example, and that the already installed lighting devices 112, 114 may, for instance, be color-only lighting devices, color and white lighting devices, white-only lighting devices, tunable white lighting devices, etc., and the new lighting device 110 may be a color-only lighting device, color and white lighting device, white-only lighting device, tunable white lighting device, etc.

The lighting control device 120 may be any type of lighting control device comprising a user input element 122 configured to receive user inputs. The lighting control device 120 may, for example be a light switch comprising one or more buttons or touch sensitive areas and/or one or more rotary switches for receiving the user input. The lighting control device 120 may, for example, comprise a gesture detection element (e.g. a camera, a motion sensor, etc.) for detecting gestured indicative of the user input. The lighting control device 120 may, for example, be a remote-control device comprising a touch-sensitive display for receiving the user input. It should be understood that these types of lighting control device 120 are mere examples, and that the skilled person is able to design alternatives without departing from the scope of the appended claims.

The lighting control device 120 comprises a control module 124 configured to control the one or more lighting devices 110, 112, 114 according to a light scene associated with a respective user input upon receiving the respective user input via the user input element 122. The control module may comprise a transmitter for transmitting lighting control commands/instructions to the one or more lighting devices 110, 112, 114 via a (wireless) network such as a WiFi, ZigBee or Bluetooth network.

The predefined light scenes may be stored as a sequence of light scenes, and the processor 104 may be configured to add the new light scene to the sequence or to replace the new light scene with one of the light scenes of the sequence. The lighting control device 120 may only have a limited number of user input elements, but by providing multiple (sequential) user inputs, a user may cycle through different scenes. For instance a user may provide a first user input via a user input element 122, which first user input may be associated with a first light scene, resulting in that the one or more lighting devices of the lighting system are controlled according to the first light scene. A user may then provide a second user input via the same user input element (for example within a predefined time period), which second user input may be associated with a second light scene, resulting in that the one or more lighting devices 112, 114 of the lighting system are (subsequently) controlled according to second light scene. This has further been illustrated in the above-mentioned examples referring to Tables 1-4.

The processor 104 may be further configured to determine the order of the sequence. The processor 104 may, for example, collect or obtain historical data indicative of historical user selections of light scenes of the sequence and determine the order (e.g. from frequently used to less frequently used) based on the historical data. Additionally or alternatively, the processor 104 may determine the order of the sequence based on the light settings of the predefined light scenes (e.g. by ordering colored scenes, and by ordering white scenes). The processor 104 may be further configured to determine the order of the sequence based on the time of day (the order may be different in the morning compared to the evening), based on a detected user activity (a user sitting on the couch may desire a different light scene compared to a user having dinner), etc.

It should be understood that a lighting control device comprising a user input element for sequential cycling through light scenes is an example of a lighting control device, and that alternatively the lighting control device may comprise multiple user input elements (e.g. multiple buttons, multiple touch sensitive surfaces, different gesture/mechanical inputs, etc.), each for receiving a user input associated with (one or more) light scenes.

The receiver 106 may be configured to receive data indicative of a distribution of one or more light sources in the new lighting device 110. The distribution of the light sources, and the light sources' control options, may be relevant in determining whether the new lighting device 110 can render certain light effects. For instance, an LED strip comprising a plurality of individually controllable color light sources can render different light effects compared to an LED bulb with a single white light source. The processor 104 may be configured to generate the new light scene further based on the distribution. The processor 104 may, for instance, generate a dynamic light scene (i.e. a light scene that changes over time) for an LED strip comprising individually controllable light sources, compared to a static light scene for a bulb. Additionally, the processor 104 may be configured to associate a first light scene with a first part of a lighting device (e.g. to a first part of an LED strip) and a second light scene with a second part the lighting device (e.g. to a second part of an LED strip) based on the distribution of the light sources of the LED strip.

The processor 104 may be configured to communicate to a user that the new light scene has been stored or replaced. The processor 104 may for example be configured to change the light output of at least the new lighting device 110 after the new light scene has been stored or replaced in the memory 108 to indicate to a user that the new light scene has been stored or replaced. The processor may, for example, change the light output of the lighting device(s) 110, 112, 114 according to the generated new light scene. Additionally or alternatively, the processor 104 may cycle through all the light scenes to indicate the (sequence of) light scenes. Additionally or alternatively, the processor may render information about the new light scene on a display (e.g. a display of the lighting control device 120).

The processor 104 may be further configured to receive a signal indicative of a user input indicative of an acceptance of the new light scene. This signal may be received from the lighting control device 120. This enables the user to accept the creation of the new light scene. The processor 104 may be further configured to receive a rejection signal indicative of a rejection of the new light scene, and, optionally, generate a subsequent new light scene when receiving the rejection.

The processor 104 may be further configured to receive information about a luminaire wherein the new lighting device 110 has been installed. The information may, for example, relate to components of the luminaire that may influence the light rendering capabilities of the new lighting device 110. The new lighting device 110 may, for example, be a white lighting device, and a lamp shade of a luminaire wherein the new lighting device 110 has been installed may have a certain color (e.g. blue). The processor 104 may use this information to create a blue light scene for the new lighting device 110, and/or add the new lighting device 110 to an existing light scene that requires blue light output.

Figure 2:
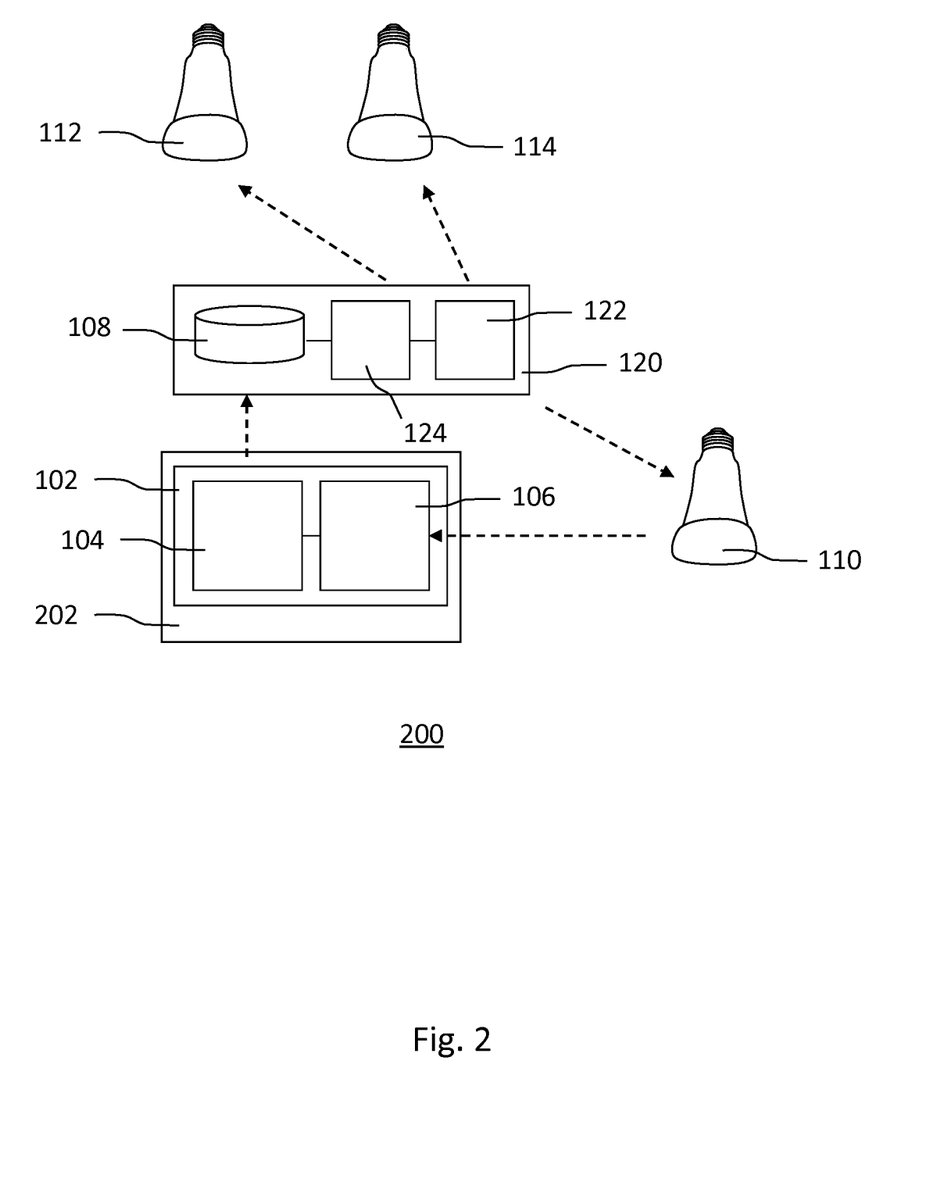
FIG. 2 shows schematically an embodiment of a lighting system comprising a lighting control device comprising a memory, lighting devices and a bridge device comprising a controller for configuring the lighting system.

In FIG. 1, the controller 102 is comprised remotely from the memory 108. The controller may, for example, be comprised in a home control system, a smart device such as a smartphone, and the memory 108 may be comprised at a remote location (e.g. connected via the internet). FIG. 2 illustrates a system 200 wherein the controller 102 is comprised in a bridge device 202 (e.g. a hub, a router, a smart device such as a smartphone, etc.) and wherein the memory 108 is comprised in the lighting control device 120. In this example, the receiver 106 may receive the light rendering capabilities of the new lighting device 110 from the new lighting device 110, and receive the lighting control settings of the lighting control device 120 from the lighting control device 120. The processor 104 may then generate the new light scene based on the lighting control settings and the light rendering capabilities, and communicate the new light scene to the lighting control device 120 to configure it.

FIG. 3 illustrates a system 300 wherein the controller 102 is comprised in the lighting control device 120. The lighting control device 120 further comprises the memory 108 and the user input element 122. The lighting control device 120 may comprise a separate control module 124, or the processor 104 may comprise the control module for controlling the one or more lighting devices 112, 114, 110 according to a light scene associated with a respective user input upon receiving the respective user input via the user input element 122. The receiver 106 comprised in the lighting control device 120 may be a transceiver further configured to communicate lighting control commands to the lighting devices 110, 112, 114 to control the lighting devices 110, 112, 114 according to the light scene associated with the respective user input.

Figure 4:
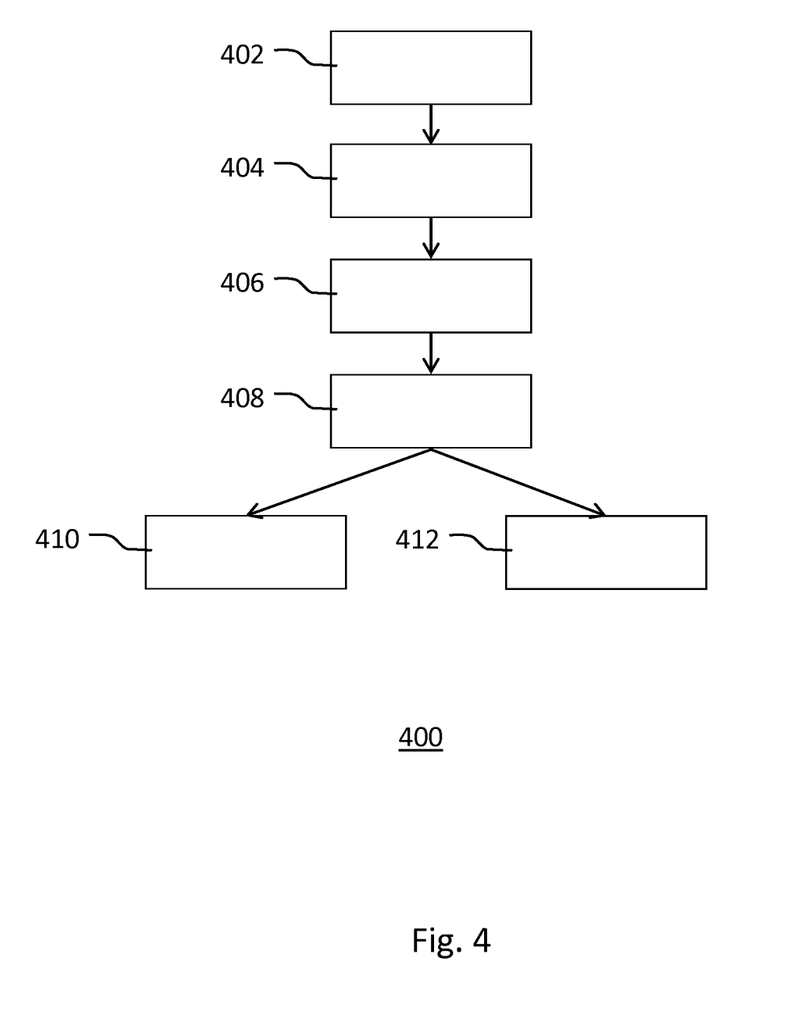
FIG. 4 shows schematically a method of configuring a lighting system.

FIG. 4 shows a method 400 of configuring a lighting system, the method 400 comprising receiving 402 a signal indicative of an addition of a new lighting device to the lighting system, receiving 404 data indicative of light rendering capabilities of the new lighting device, obtaining 406 lighting control settings of a lighting control device, wherein the lighting control settings are representative of a plurality of user inputs associated with predefined light scenes, wherein each predefined light scene is representative of lighting control instructions for one or more target lighting devices, generating 408 a new light scene based on the light rendering capabilities of the new lighting device, the new light scene comprising lighting control instructions for at least the new lighting device, and storing 410 an association between the new light scene and a new user input in a memory, or replacing 412 the new light scene with one of the plurality of predefined light scenes in the memory.

The method 400 may be executed by computer program code of a computer program product when the computer program product is run on a processing unit of a computing device such as the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A controller for configuring a lighting system, the lighting system comprising a lighting control device configured to receive a plurality of user inputs, wherein the plurality of user inputs are associated with predefined light scenes, wherein each predefined light scene is representative of lighting control instructions for one or more target lighting devices, the controller comprising:
   a receiver configured to receive a signal indicative of an addition of a new lighting device to the lighting system, and to receive data indicative of light rendering capabilities of the new lighting device, and
   a processor configured to:
   a) obtain, from a memory 108, lighting control settings of the lighting control device, wherein the lighting control settings are representative of the plurality of user inputs associated with the predefined light scenes,
   b) generate a new light scene based on the light rendering capabilities of the new lighting device, the new light scene comprising lighting control instructions for at least the new lighting device, and c) replace the new light scene with one of the plurality of predefined light scenes in the memory.

2. The controller of claim 1, wherein the processor is further configured to assign the new lighting device to at least one of the predefined light scenes based on the light rendering capabilities of the new lighting device.

3. The controller of claim 1, wherein the predefined light scenes are stored as a sequence of light scenes, and wherein the processor is configured replace the new light scene with one of the light scenes of the sequence.

4. The controller of claim 3, wherein the processor is further configured to collect or obtain historical data indicative of historical user selections of light scenes of the sequence, and to determine the order of the sequence based on the historical user selection.

5. The controller of claim 3, wherein the processor is further configured to determine the order of the sequence based on the light settings of the predefined light scenes.

6. The controller of claim 1, wherein the receiver is configured to receive light rendering capabilities of the one or more lighting devices, and wherein the processor is configured to generate the new light scene further based on the light rendering capabilities of the one or more lighting devices, such that the new light scene further comprises lighting control instructions for at least one of the one or more lighting devices.

7. The controller of claim 1, wherein the receiver is further configured to receive data indicative of a distribution of one or more light sources in the new lighting device, and wherein the generation of the new light scene is further based on the distribution.

8. The controller of claim 1,
wherein the predefined light scenes are color light scenes, and wherein the light rendering capabilities of the new lighting device are indicative of that the new lighting device is configured to provide white light, and wherein the processor is configured to generate a white light scene as the new light scene, or
wherein the predefined light scenes are white light scenes, and wherein the light rendering capabilities of the new lighting device are indicative of that the new lighting device is configured to provide colored light, and wherein the processor is configured to generate a color light scene as the new light scene.

9. The controller of claim 1, wherein the processor is configured to change the light output of at least the new lighting device after the new light scene has been replaced to indicate to a user that the new light scene has been replaced.

10. The controller of claim 1, wherein the controller is comprised in a bridge device, and wherein the memory is comprised in the lighting control device, and wherein the processor is configured to communicate the new light scene to the lighting control device.

11. A lighting control device for configuring a lighting system, comprising:
the controller of claim 1,
a user input element configured to receive the plurality of user inputs,
the memory configured to store associations between the plurality of user inputs and the predefined light scenes,
a control module configured to control the one or more lighting devices, according to a light scene associated with a respective user input upon receiving the respective user input.

12. The lighting control device of claim 11, wherein the lighting control device is configured to receive a configuration user input, and wherein the processor is configured to set the lighting control device in a configuration mode based on the configuration user input, wherein, in the configuration mode, the receiver is configured to receive the signal from the new lighting device.

13. The lighting control device of claim 11, wherein the predefined light scenes are stored as a sequence of light scenes in the memory, and wherein the control module is configured to control the one or more target lighting devices according to a subsequent light scene of the sequence each time a user provides a user input via the user input element.

14. A method of configuring a lighting system, the lighting system comprising a lighting control device configured to receive a plurality of user inputs, wherein the plurality of user inputs are associated with predefined light scenes, wherein each predefined light scene is representative of lighting control instructions for one or more target lighting devices, the method comprising:
receiving a signal indicative of an addition of a new lighting device to the lighting system,
receiving data indicative of light rendering capabilities of the new lighting device,
obtaining, from a memory, lighting control settings of the lighting control device, wherein the lighting control settings are representative of the plurality of user inputs associated with the predefined light scenes,
generating a new light scene based on the light rendering capabilities of the new lighting device, the new light scene comprising lighting control instructions for at least the new lighting device, and
replacing the new light scene with one of the plurality of predefined light scenes in the memory.

15. A computer program product for a computing device, the computer program product comprising computer program code to perform the method of claim 14 when the computer program product is run on a processing unit of the computing device.

* * * * *